United States Patent [19]
Saffron

[11] 3,776,680
[45] Dec. 4, 1973

[54] EXTRUDER MOVEMENT
[75] Inventor: Ronald George Saffron, London, England
[73] Assignee: Hayssen Manufacturing Company, Sheboygan, Wis.
[22] Filed: Jan. 27, 1972
[21] Appl. No.: 221,393

Related U.S. Application Data
[63] Continuation of Ser. No. 882,913, Dec. 8, 1969, abandoned.

[30] Foreign Application Priority Data
Feb. 14, 1969  Great Britain ............... 8,104/69

[52] U.S. Cl. .................. 425/326, 425/DIG. 206
[51] Int. Cl. .................................. B29d 23/03
[58] Field of Search ........... 425/326, 387, DIG. 203, 425/DIG. 206

[56] References Cited
UNITED STATES PATENTS
3,005,231  10/1961  Pechthold ..................... 425/326
2,790,994  5/1957   Cardot et al. .................. 425/326 X
2,975,473  3/1961   Hagen et al. .................. 425/326 X
2,988,776  6/1961   Schaich ......................... 425/326 X
3,038,200  6/1962   Whitbourn ..................... 425/326 X
3,125,619  3/1964   Miller .......................... 425/326 X
3,217,072  11/1965  Schaich ......................... 425/326 X Primary Examiner—J. Spencer Overholser
Assistant Examiner—Michael O. Sutton
Attorney—William Anthony Drucker

[57] ABSTRACT

In a blow moulding machine of the kind in which an extruder feeds a tubular extrusion into a two-part die, the die subsequently closing and gripping the extrusion and the extruder being retracted to stretch the extrusion for severing between the extruder nozzle and the die, the extruder nozzle is arranged to retract linearly and axially from the die so as to cause the extrusion to be stretched symmetrically and linearly along its axis, thereby resulting in the severed edges of the extrusion being in a plane normal to the axis of the extrusion.

2 Claims, 6 Drawing Figures

INVENTOR:
RONALD G. SAFFRON

EXTRUDER MOVEMENT

This application is a continuation of my parent application Ser. No. 882,913 filed Dec. 8, 1969 and now abandoned.

This invention relates to machines for the blow-moulding of hollow articles from thermoplastic material.

In a known method of operating a machine for the blow-moulding of hollow articles from thermoplastic material, the material is produced as a continuous tubular extrusion, known as a parison, which is fed to a multi-part die, the parison being subsequently severed between the extruder and the die. The feeding of the parison to the die entails a relative approaching movement of the extruder and die, whereafter the extruder and die move relatively apart again to stretch the parison and permit it to be severed between the extruder and die. Hitherto, these movements of approaching and separation of the extruder and die have conventionally been obtained by rocking at least the extruder head, or the entire extruder, about a horizontal axis, with the result that the path of the approach and separation movements was arcuate. This in turn resulted in the extruder nozzle and the die being, at the moment of severing of the parison, out of axial alignment, whereby the stretched portion of the parison became, at the moment of severing, a shape which was not cylindrical but tended towards a somewhat oval cross-section. The result of linear severing of the parison while it had this non-cylindrical section was that, upon release of tension in the parison, permitting it to return to its unstretched condition, a non-circular non-plane cut edge was formed on the parison and on the leading portion of the remainder of the extrusion still issuing from the nozzle.

It is accordingly the object of the present invention to provide, in a blow-moulding machine, an extruder and die of which the relative movements are so arranged that the parison is in a laterally undistorted, e.g., cylindrical, form at the moment of severing, whereby upon release of tension permitting the parison and the remainder of the extrusion to return to their unstretched condition, they both have severed edges which lie in a transverse plane normal to the axis of the extrusion.

According to the present invention, a blow moulding machine comprises an openable blowing die having two portions meeting at a plane of separation, and an extruder having a nozzle which is presented with its axis aligned with said plane of separation for feeding a tubular extrusion to be gripped between the die portions. The machine is characterised in that the extruder nozzle is arranged to withdraw from the die portions, when they are closed onto and gripping the extrusion, linearly along its axis thereby to stretch linearly and axially that portion of the extrusion which is situated between the nozzle and the closed die.

Whilst that portion of the extrusion is so stretched, a severing knife is passed across linearly and normally to the axis of the extrusion, and the extrusion is severed between the die and the nozzle.

It is convenient to shift the extruder as a whole along the axis of the nozzle, and in a preferred embodiment the blow-moulding machine comprises a base structure, guide means carried by the base structure parallel to the axis of the extruder nozzle, a mounting slidable with respect to the guide means and carrying the extruder, and a hydraulic ram coupled between the guide means and the mounting for shifting the extruder along the axis of the extruder nozzle.

In order that the nature of the invention may be readily ascertained, an embodiment of blow-moulding machine in accordance therewith is hereinafter particularly described with reference to the figures of the accompanying drawings, wherein.

Figure 1:
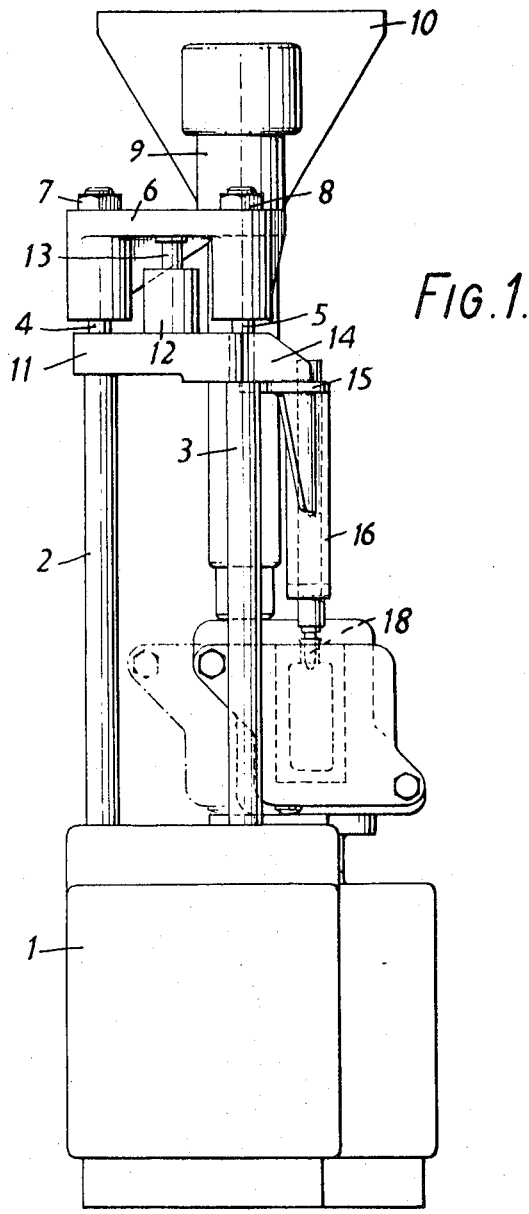
FIG. 1 is a side elevation of the blow-moulding machine.
Figure 2:
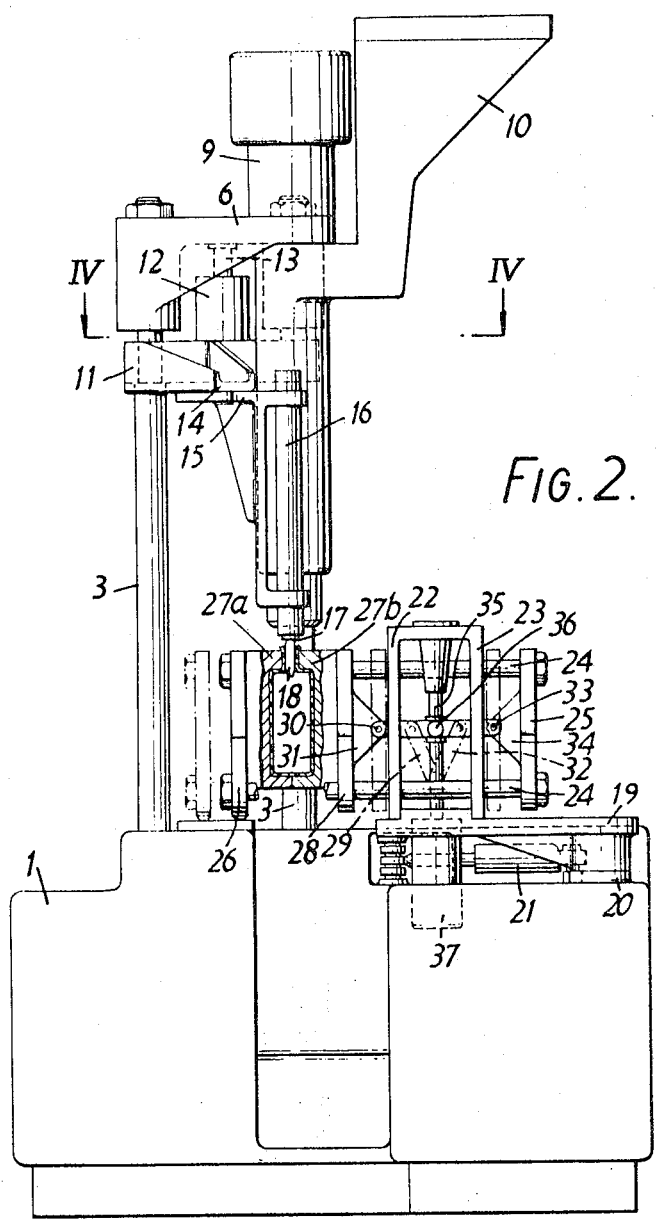
FIG. 2 is a front elevation of the blow-moulding machine.

Only those portions of the entire machine which are necessary to a description of the invention are illustrated, the provision of the remainder of the machine, such as compressed fluid supply means, timing means, and means for transporting of blown mouldings, being well within the knowledge of those skilled in this art.

The blow-moulding machine comprises a base structure 1 on which are provided parallel vertical columns 2, 3 which act as guides for two slide rods 4, 5 which are a close fit but can move upwardly and downwardly in a bore in the respective column. The slide rods 4, 5 are engaged through collar formations of a triangular mounting platform 6 and are tightened onto the platform 6 by means of respective nuts 7, 8 engaged onto the threaded upper end of the rod. The platform 6 serves as a mounting for a rotary extruder 9 rranged with its axial vertical and having a conventional filling hopper 10.

On the upper end of the two columns 3, 4 there is seated a cross-bar 11 at the centre of which there is mounted the cylinder 12 of a hydraulic ram. The piston rod 13 of the ram is engaged under the platform 6. It will be apparent that, by applying hydraulic pressure to the ram 12, 13 the entire assembly of platform 6 and extruder 9 can be lifted and that during this lifting movement the nozzle of the extruder, at the lower end thereof, travels in a straight line along its own axis. When the hydraulic pressure is removed, the assembly of platform 6 and extruder lowers by gravity.

The cross-bar 11 has a lateral arm 14 to which there is secured, at the underside, a frame 15 carrying a vertically disposed hydraulic cylinder 16 of another hydraulic ram. The piston 17 thereof carries a blowing mandrel 18 serving, at the appropriate moment during the operation of the machine, to pass into engagement with a portion of parison in a mould, for blowing the parison to the shape of the mould cavity. The piston 17 and mandrel 18 can be raised and lowered by appropriate application of fluid pressure to the ram 16, 17.

On the base structure 1 of the machine there is mounted a horizontal carrier plate 19 which can be swung about a vertical axis. The plate 19 is integral with a crank arm 20, and the arm 20 is linked by a pivot to the cylinder 21 of a further hydraulic ram having its piston coupled to a fixed portion of the base structure. By appropriate feeding of hydraulic fluid under pressure to the ram cylinder 21, the carrier plate 19 can be swung through a small horizontal arc. On the carrier plate 19 there is mounted a pair of spaced upright walls 22, 23 which serves as slide bearings for upper and lower pairs of horizontally spaced guide rods 24. The four rods 24 are all coupled at one end by engagement through an end plate 25.

At their other end, the four rods 24 are coupled by another end plate 26 which carries one portion 27a of a two-part blowing die adapted to open at its central vertical plane. The other portion 27b of the blowing die is mounted on a plate 28 which is slidable on the rods 24. A toggle device, for operation of th die portions, has two pairs of parallel arms. One pair 29 of such arms is coupled by a pivot 30 to a block 31 on the plate 28. The other pair 32 of such arms is connected by a pivot 33 to a block 34 on the end plate 25. The two pairs of arms are connected to each other, and to a piston rod 35, by a common pivot 36. The piston rod 35 forms part of a vertically disposed hydraulic ram having a cylinder 37. Operation of the ram 35, 37 causes equal and opposite movements of the plates 25 and 28, and of the two die portions 27a, 27b.

Figure 3:
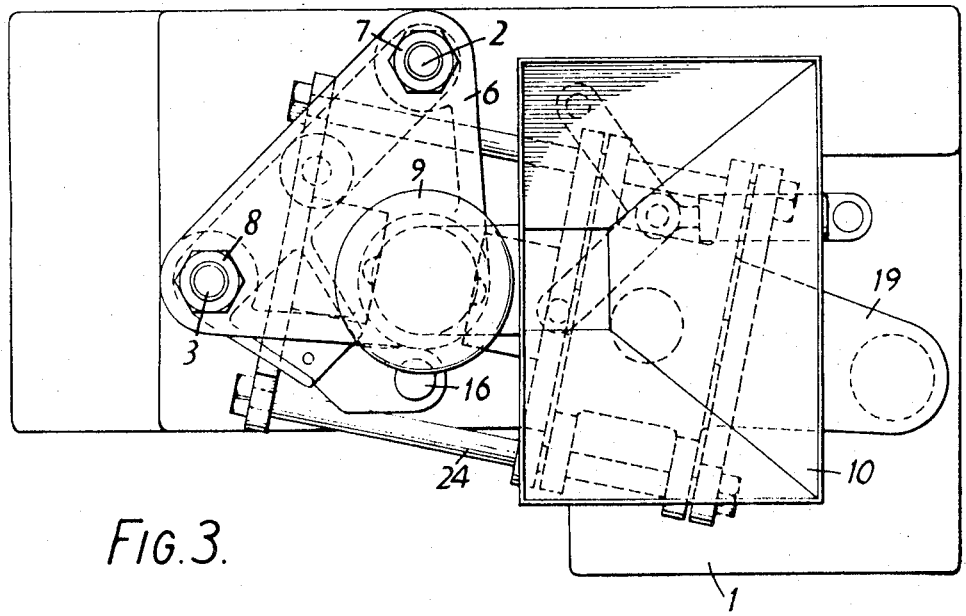
FIG. 3 is a plan view of the blow-moulding machine.
Figure 4:
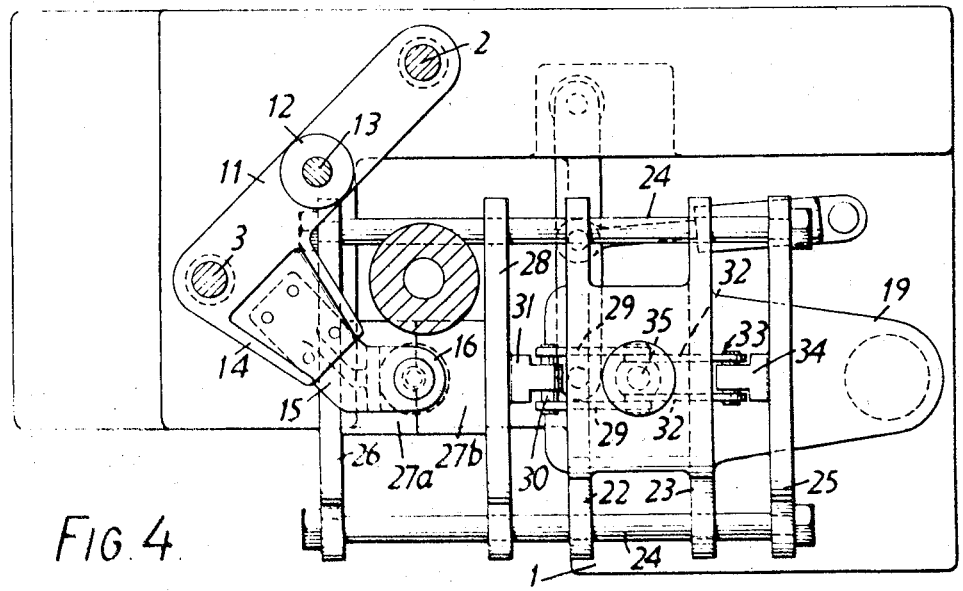
FIG. 4 is a horizontal section taken at the line IV—IV of FIG. 2.
Figure 5A:
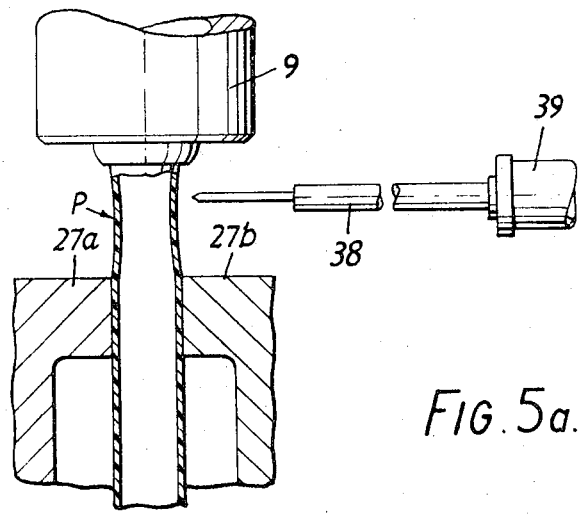
FIGS. 5a and 5b are diagrams to show the stretching and severing of the parison.
Figure 5B:
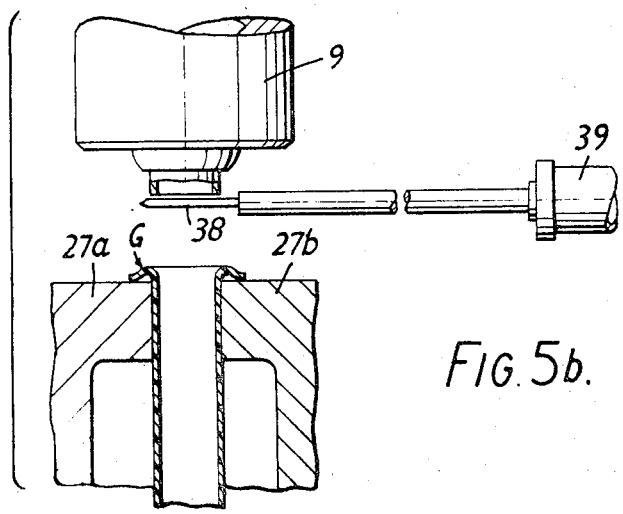

The lateral swinging movement which is performed by the carrier plate 19 is such as to bring the median line of the plane of separation of the die portions into alignment, at one end of the swinging movement, with the axis of the extruder 9 and, at the other end of the swinging movement, with the axis of the blowing mandrel 18. FIG. 3 shows the position of the carrier plate 19 in which the plane of separation of the die portions is in alignment with the axis of the extruder 9, and FIG. 4 shows the position in which it is in alignment with the axis of the mandrel 18.

The operation is as follows:

At the end of a previous cycle, ram 37 has been operated to separate the die portions 27a, 27b to their fullest extent. The extruder 9 extrudes a cylindrical tube or parison P of softened plastics material, such as polyvinylchloride, from its nozzle and at the same time the die assembly is swung across until the extrusion is lying in the gap between the two separated die portions. At the appropriate moment, when a suitable length of extrusion has passed down between the die portions, the ram 37 is operated to close the die portions onto the parison, which is gripped between coacting surfaces at the lower part of the respective die portions. The ram 12 is then operated, to cause the extruder as a whole to be lifted and thereby cause stretching of that portion of the parison which is positioned between the extruder nozzle and the upper end of the closed die. As the extruder nozzle moves upwardly along the axis of the die, the stretched parison remains cylindrical, although of slightly reduced diameter.

This stretched portion of the parison is then severed along a horizontal plane by a severing blade 38 which can be reciprocated by appropriate feed of hydraulic fluid under pressure to a hydraulic ram 39. The plane of movement of the blade 38 is situated nearer to the nozzle than to the die. As soon as severing has occurred, the two severed portions shrink back oppositely in the axial direction, but the severed edge of each of them is circular and in a plane normal to the axis of the parison.

The portion of the extrusion which is exposed above the top of the closed die passes downwardly and falls outwardly at its periphery so as to form a rim on the top of the die, thereby presenting a neck or guide G which facilitates subsequent entry of a blow stick, as described below. The formation of the rim or neck also assists in preventing the severed parison from merely falling through the open upper end of the die into the interior of the die.

The carrier plate 19 is then swung to its other end position in which the closed die, containing the parison, is presented coaxially below the blowing mandrel 18. The ram 16 is operated to lower the mandrel down into the open upper end of the parison. When the mandrel is fully lowered, air under pressure is fed through the mandrel to blow the parison to the shape of the cavity defined between the two mould portions 27a, 27b.

With the die still closed, the top flash is then removed. When the blowing has finished, and assuming that the material has cooled sufficiently to be self-supporting, the die is opened, leaving the blown moulding carried on the blowing mandrel.

The carrier plate 19 is then swung back to its other end position to bring the separated mould portions into alignment with the extruder for the same cycle of operations to be repeated.

I claim:

1. In combination in a machine for the blow-moulding of hollow articles from a tubular parison, an openable blowing die having separable portions adapted to meet at a plane of separation, an extruder including a nozzle and adapted to produce through said nozzle a continuously form tubular extrusion, said nozzle having its central longitudinal axis aligned with said plane of separation of the die portions, said extruder being movable linearly along its axis towards and away from the die portions, severing means movable normally to the axis of the extruder nozzle and positioned to pass between the extruder nozzle and the blowing die, means for closing the die portions onto a portion of tubular extrusion issuing from the extruder, means for moving the extruder along its axis away from the closed die portions, at a speed greater than the speed of issuance of the extrusion, and for stretching linearly and axially that part of the tubular extrusion which lies between the extruder nozzle and the closed die portions, and means to sever said part of the tubular extrusion while it is linearly and axially stretched, and means for operating the machine in the above sequence.

2. The combination of claim 1, further comprising a base structure, guide means carried by said base structure and disposed parallel to the axis of the extruder nozzle, and a mounting slidable with respect to said guide means and carrying said extruder, and wherein said driving means includes a hydraulic ram coupled to said guide means and to said mounting for moving the extruder along the axis of the extruder nozzle.

* * * * *